United States Patent
Han

(10) Patent No.: US 12,489,880 B2
(45) Date of Patent: Dec. 2, 2025

(54) ELECTRONIC DEVICE FOR PROVIDING AR/VR ENVIRONMENT, AND OPERATION METHOD THEREOF

(71) Applicant: SAMSUNG ELECTRONICS CO., LTD., Suwon-si (KR)

(72) Inventor: Seunghoon Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 170 days.

(21) Appl. No.: 18/455,967

(22) Filed: Aug. 25, 2023

(65) Prior Publication Data

US 2023/0403389 A1    Dec. 14, 2023

Related U.S. Application Data

(63) Continuation of application No. PCT/KR2021/019092, filed on Dec. 15, 2021.

(30) Foreign Application Priority Data

Feb. 25, 2021    (KR) .................. 10-2021-0025824

(51) Int. Cl.
   *H04N 13/351*    (2018.01)
   *G06T 17/00*    (2006.01)
   *H04N 13/302*    (2018.01)

(52) U.S. Cl.
   CPC .......... *H04N 13/351* (2018.05); *G06T 17/00* (2013.01); *H04N 13/302* (2018.05)

(58) Field of Classification Search
   CPC .... G06T 17/00; H04N 13/189; H04N 13/302; H04N 13/344; H04N 13/351; H04N 13/359; H04N 21/81
   See application file for complete search history.

(56) References Cited

U.S. PATENT DOCUMENTS 7,015,920 B2    3/2006 Ono
9,986,220 B2    5/2018 Newton et al.
(Continued)

FOREIGN PATENT DOCUMENTS

JP    2004334196 A    11/2004
JP    2012238289 A    12/2012
(Continued)

OTHER PUBLICATIONS

International Search Report for PCT/KR2021/019092, mailed Mar. 29, 2022, 4 pages.
(Continued)

*Primary Examiner* — Ming Wu
(74) *Attorney, Agent, or Firm* — Nixon & Vanderhye, P.C.

(57) ABSTRACT

An example electronic device may include a display, a processor, and a memory. The memory may store instructions which, when executed, enable the processor to: execute a first application providing a stereoscopic screen; store, in a first frame buffer, a first execution screen generated by rendering a screen provided by the first application; while the first execution screen is being displayed, identify an execution request of a second application providing a non-stereoscopic screen; execute the second application in response to the execution request of the second application; store, in the first frame buffer, a second execution screen generated by rendering a screen provided by the second application; store, in a second frame buffer different from the first frame buffer, a third execution screen generated by stereoscopic-rendering the second execution screen; change a frame buffer referred to by the display from the first frame buffer to the second frame buffer; and display the third execution screen.

20 Claims, 12 Drawing Sheets

(56) References Cited

U.S. PATENT DOCUMENTS

| | | | |
|---|---|---|---|
| 10,021,377 B2 | 7/2018 | Newton et al. | |
| 10,332,299 B2 | 6/2019 | Hoerentrup | |
| 11,048,376 B2 | 6/2021 | Srinivasan et al. | |
| 11,494,986 B2 | 11/2022 | Harscoet et al. | |
| 2013/0009951 A1 | 1/2013 | Kwon et al. | |
| 2016/0019720 A1 | 1/2016 | Thurber et al. | |
| 2016/0261841 A1 | 9/2016 | Mathew et al. | |
| 2018/0205930 A1* | 7/2018 | Yano | H04N 13/327 |
| 2018/0218178 A1* | 8/2018 | Chung | H04N 13/361 |
| 2019/0082167 A1* | 3/2019 | Shinohara | B60K 35/211 |
| 2019/0342536 A1* | 11/2019 | Deluca | H04N 13/332 |
| 2021/0037225 A1* | 2/2021 | Pepperell | G06F 3/013 |
| 2021/0042946 A1* | 2/2021 | Groh | B60W 60/001 |
| 2021/0063746 A1* | 3/2021 | Aiki | G02B 27/017 |
| 2021/0072556 A1* | 3/2021 | Kim | G02B 30/29 |
| 2022/0055480 A1 | 2/2022 | Lee et al. | |

FOREIGN PATENT DOCUMENTS

| | | |
|---|---|---|
| KR | 20120049292 A | 5/2012 |
| KR | 20130005153 A | 1/2013 |
| KR | 20130135828 A | 12/2013 |
| KR | 20140010120 A | 1/2014 |
| KR | 20160016567 A | 2/2016 |
| KR | 20190133055 A | 11/2019 |

OTHER PUBLICATIONS

Written Opinion of the ISA for PCT/KR2021/019092, mailed Mar. 29, 2022, 4 pages.
Office Action dated Apr. 24, 2025 in Korean Patent Application No. 10-2021-0025824 and English-language translation.

\* cited by examiner

ELECTRONIC DEVICE FOR PROVIDING AR/VR ENVIRONMENT, AND OPERATION METHOD THEREOF

CROSS-REFERENCE TO RELATED APPLICATIONS

This application is a continuation of International Application No. PCT/KR2021/019092 designating the United States, filed on Dec. 15, 2021, in the Korean Intellectual Property Receiving Office and claiming priority to Korean Patent Application No. 10-2021-0025824, filed on Feb. 25, 2021, in the Korean Intellectual Property Office, the disclosures of all of which are incorporated by reference herein in their entireties.

BACKGROUND

Field

The disclosure relates to an electronic device that provides an augmented reality/virtual reality (AR/VR) environment and a method for operating the same.

Description of Related Art

Electronic devices may provide an augmented reality (AR) environment and/or a virtual reality (VR) environment to a user. For example, the electronic device may provide various contents to the user through an application providing an AR environment and/or a VR environment.

A VR environment may, for example, be an environment that provides a user with a fully artificial digital image, often rendered in a virtual space. An AR environment may, for example, be an environment that provides an image in which a virtual object is overlaid on an image representing the real world.

Also, an electronic device may provide a three-dimensional effect AR environment and/or VR environment to the user by displaying a stereoscopic screen generated through an application. Here, the stereoscopic screen may include a screen corresponding to the user's left eye and a screen corresponding to the user's right eye. The screen corresponding to the left eye and the screen corresponding to the right eye may be screens representing the same content having different focus.

SUMMARY

When a screen displayed by an electronic device is switched from a stereoscopic screen to a non-stereoscopic screen, the three-dimensional effect of the stereoscopic AR environment and/or the stereoscopic VR environment may disappear. As the three-dimensional effect disappears, a user may experience discomfort. Also, as the three-dimensional effect disappears, the user's sense of immersion may be impaired.

According to an example embodiment of the disclosure, an electronic device may include a display, a processor, and a memory operatively connected to the display and the processor. The memory may store instructions that, when executed, cause the processor to execute a first application providing a stereoscopic screen, store a first execution screen generated by rendering a screen provided by the first application in a first frame buffer, identify an execution request of a second application providing a non-stereoscopic screen while the first execution screen is displayed on the display, execute the second application in response to the execution request of the second application, store a second execution screen generated by rendering a screen provided by the second application in the first frame buffer, store a third execution screen generated by stereoscopic rendering of the second execution screen in a second frame buffer different from the first frame buffer, change a frame buffer which is referenced by the display from the first frame buffer to the second frame buffer, and allow the display to display the third execution screen.

According to an example embodiment of the disclosure, a method of operating an electronic device may include executing a first application providing a stereoscopic screen, storing a first execution screen generated by rendering a screen provided by the first application in a first frame buffer, identifying an execution request of a second application providing a non-stereoscopic screen while the first execution screen is displayed, executing the second application in response to the execution request of the second application, storing a second execution screen generated by rendering a screen provided by the second application in the first frame buffer, storing a third execution screen generated by stereoscopic rendering of the second execution screen in a second frame buffer different from the first frame buffer, changing a frame buffer which is referenced by a display from the first frame buffer to the second frame buffer, and allowing the display to display the third execution screen.

According to the example embodiments of the disclosure, an electronic device may preserve a user's sense of immersion by rendering a non-stereoscopic screen provided by an application into a stereoscopic screen.

In addition to this, various effects identified directly or indirectly through this disclosure may be provided.

Effects achieved through various example embodiments of the disclosure are not be limited to those particularly described herein, and other effects and advantages not described herein will be more clearly understood from the following detailed description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In connection with the description of the drawings, the same or similar reference numerals may be used for the same or similar components.

DETAILED DESCRIPTION

Figure 1:
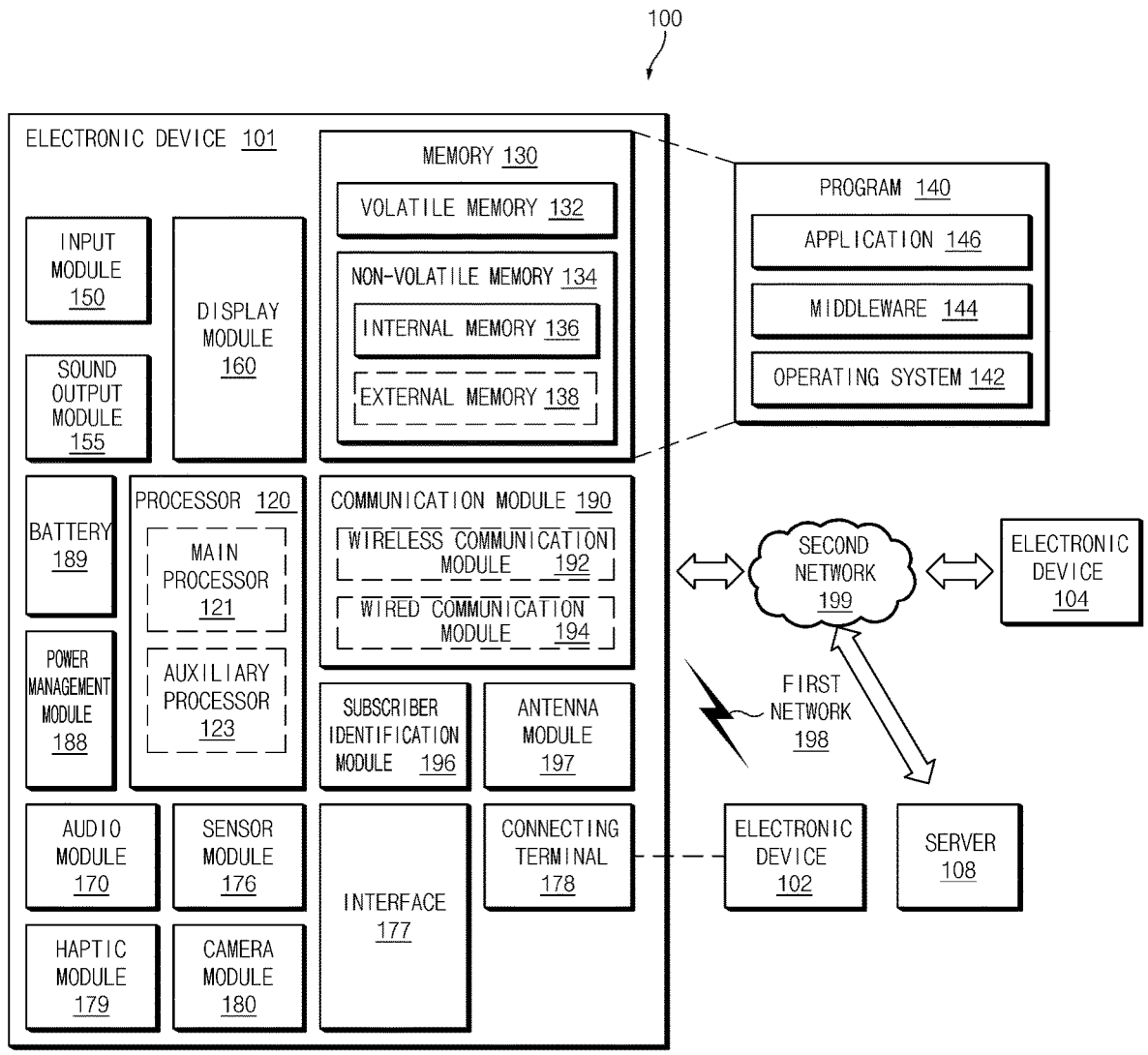
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

It should be appreciated that various embodiments of the present disclosure and the terms used therein are not intended to limit the technological features set forth herein to particular embodiments and are intended to include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium, where the term "non-transitory" refers to the storage medium being a tangible device, and does not include a signal (e.g., an electromagnetic wave), but this term does not differentiate between data being semi-permanently stored in the storage medium and data being temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
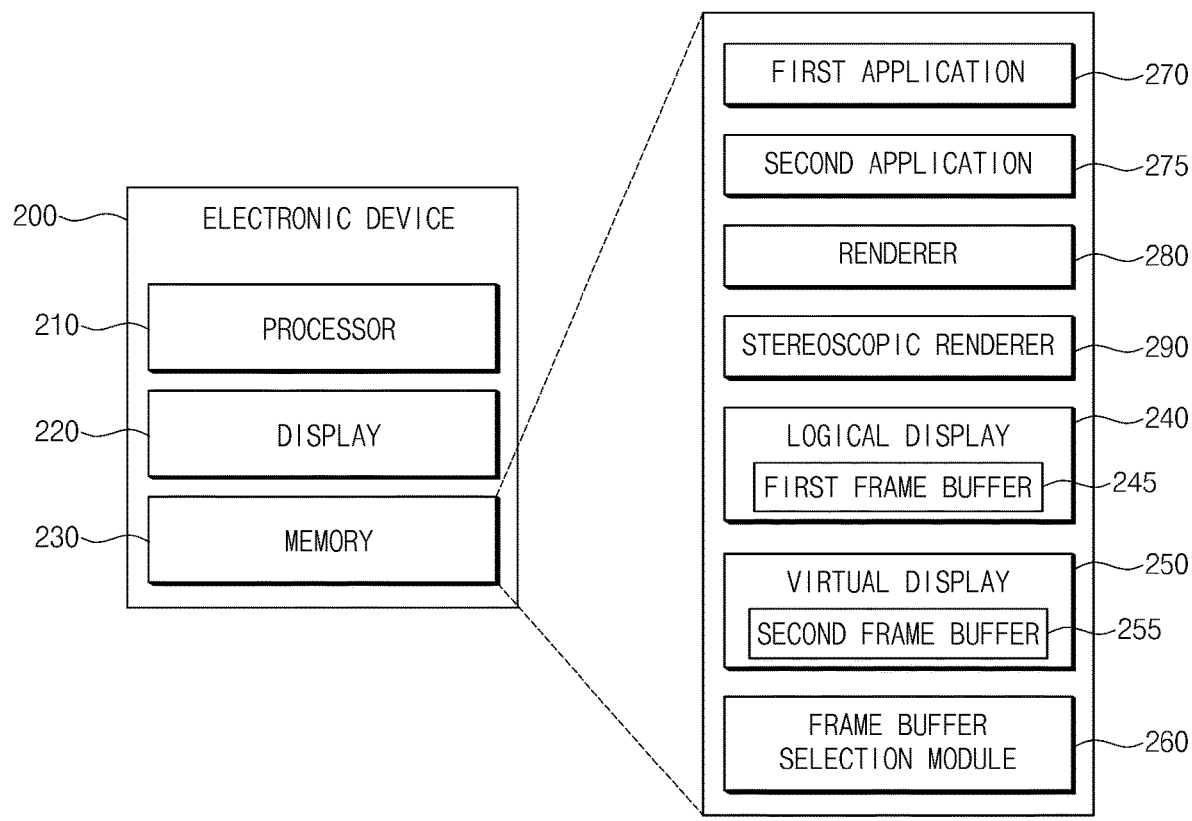
FIG. 2 illustrates a configuration of an example electronic device, according to various embodiments.

FIG. 2 illustrates a configuration of an example electronic device, according to various embodiments.

According to an embodiment, an electronic device 200 (e.g., the electronic device 101 of FIG. 1) may include a processor 210 (e.g., the processor 120 of FIG. 1), a display 220 (e.g., the display module 160 of FIG. 1), and/or a memory 230 (e.g., the memory 130 of FIG. 1).

According to an embodiment, the electronic device 200 may be a device for providing an AR environment and/or a VR environment in a 3D space to a user. According to an embodiment, the electronic device 200 may be a device (e.g., a head mounted display (HMD) device) that can be worn on a part (e.g., the head) of the user's body. According to an embodiment, the electronic device 200 may be mounted on a separate device. The separate device may, for example, be a device that can be worn on a part (e.g., the head) of the user's body. As the electronic device 200 is mounted on a separate device, the electronic device 200 may provide a user with an AR environment and/or a VR environment in a 3D space.

According to an embodiment, when the electronic device 200 is worn by a user, the display 220 may be disposed at a position recognizable through the user's left and/or right eyes. According to an embodiment, when the electronic device 200 is worn by a user, the display 220 may be disposed at a position corresponding to the user's field of view (FOV). According to an embodiment, the display 220 may include a first display area facing the user's left eye (or a FOV of the left eye) and a second display area facing the user's right eye (or a FOV of the right eye). According to an embodiment, the first display area and the second display area may be separate areas on the same display. According to an embodiment, the first display area and the second display area may be areas on different displays.

According to an embodiment, the processor 210 may provide an AR environment and/or a VR environment in a 3D space to a user through the display 220. For example, the processor 210 may overlay and display a virtual object on the real world through the display 220. For another example, the processor 210 may display a screen representing a virtual world separated from the real world through the display 220.

According to an embodiment, a screen displayed by the processor 210 through the display 220 may be a stereoscopic screen. According to an embodiment, one stereoscopic screen may include a first stereoscopic screen and a second stereoscopic screen. The processor 210 may display the first stereoscopic screen on the first display area and the second stereoscopic screen on the second display area. For example, the first stereoscopic screen may correspond to the left eye (or a FOV of the left eye), and the second stereoscopic screen may correspond to the right eye (or a FOV of the right eye). According to an embodiment, the first stereoscopic screen and the second stereoscopic screen may be screens displaying the same content with different focus.

According to an embodiment, the memory 230 may include a logical display 240, a virtual display 250, a frame buffer selection module 260, a first application 270, a second application 275, a renderer 280, and/or a stereoscopic renderer 290. The logical display 240, the virtual display 250, and the frame buffer selection module 260 may, for example, be programs stored in the memory 230 in the form of instructions (e.g., the program 140 of FIG. 1). The first application 270, the second application 275, the renderer 280, and the stereoscopic renderer 290 may, for example, be software programs executed in the operating system (e.g., 142 of FIG. 1) of the electronic device 200.

According to an embodiment, the logical display 240 and the virtual display 250 may store information related to the display 220. For example, the logical display 240 and the virtual display 250 may store horizontal size information, vertical size information, and/or rotation information of a screen to be displayed on the display 220. According to an embodiment, the logical display 240 may include a first frame buffer 245. For example, the first frame buffer 245 may store a screen to be displayed on the logical display 240. The virtual display 250 may include a second frame buffer 255. For example, the second frame buffer 255 may store a screen to be displayed on the virtual display 250.

According to an embodiment, the frame buffer selection module 260 may select one of the first frame buffer 245 and the second frame buffer 255. The display 220 may refer to the frame buffer selected by the frame buffer selection module 260. For example, an execution screen stored in a frame buffer selected by the frame buffer selection module 260 may be displayed on the display 220. For example, data stored in the frame buffer selected (or instructed) by the frame buffer selection module 260 from among the first frame buffer 245 of the logical display 240 and the second frame buffer 255 of the virtual display 250 may be input to the display 220. According to an embodiment, an operation of the frame buffer selection module 260 may actually be performed by the processor 210.

According to an embodiment, the first application 270 may be an application for providing an AR environment and/or a VR environment. According to an embodiment, the first application 270 may be an application that provides a stereoscopic screen. According to an embodiment, the first application 270 may use a frame buffer that is distinct from the first frame buffer 245 and the second frame buffer 255.

According to an embodiment, the second application 275 may be an application for providing a non-stereoscopic screen. According to an embodiment, the second application 275 may be an application for providing an environment (e.g., a use environment on a two-dimensional space) distinct from an AR environment and/or a VR environment. In an embodiment, the second application 275 may use a frame buffer that is distinct from the first frame buffer 245 and the second frame buffer 255.

According to an embodiment, the renderer 280 may draw an execution screen of an application (e.g., the first application 270 or the second application 275) on a surface allocated to the application. According to an embodiment, the renderer 280 may store the rendered execution screen in the first frame buffer 245.

According to an embodiment, the stereoscopic renderer 290 may render (or convert) an arbitrary screen into a stereoscopic screen. The stereoscopic renderer 290 may render a non-stereoscopic screen into a stereoscopic screen.

According to an embodiment, the stereoscopic renderer 290 may render a screen stored in the first frame buffer 245 as a stereoscopic screen. According to an embodiment, the stereoscopic renderer 290 may store the rendered stereoscopic screen in the second frame buffer 255. Hereinafter, a rendering operation according to an example embodiment of the disclosure will be described with reference to FIGS. 3A and 3B, and a stereoscopic rendering operation for a non-stereoscopic screen according to an example embodiment of the disclosure will be described with reference to FIGS. 4A, 4B, and 4C.

According to an example embodiment, the electronic device 200 may include the display 220, the processor 210, and the memory 230 operatively connected to the display 220 and the processor 210. The memory 230 may further store instructions that, when executed, cause the processor 210 to execute the first application 270 providing a stereoscopic screen, store a first execution screen generated by rendering a screen provided by the first application 270 in the first frame buffer 245, identify an execution request of the second application 275 providing a non-stereoscopic screen while the first execution screen is displayed on the display 220, execute the second application 275 in response to the execution request of the second application 275, store a second execution screen generated by rendering a screen provided by the second application 275 in the first frame buffer 245, store a third execution screen generated by stereoscopic rendering of the second execution screen in the second frame buffer 255 different from the first frame buffer 245, change a frame buffer which is referenced by the display 220 from the first frame buffer 245 to the second frame buffer 255, and allow the display 220 to display the third execution screen.

According to an example embodiment, the memory 230 may further store instructions that, when executed, cause the processor 210 to change a pointer value linked to the display 220 when a frame buffer referenced by the display 220 is changed from the first frame buffer 245 to the second frame buffer 255.

According to an example embodiment, the stereoscopic screen may include a screen corresponding to the right eye of the user and a stereoscopic screen corresponding to the left eye of the user.

According to an example embodiment, the first execution screen may include a user interface (UI) for executing the second application 275, and the memory 230 may further store instructions that, when executed, cause the processor 210 to execute the second application 275 based on a first user input with respect to the UI.

According to an example embodiment, the memory 230 may further store instructions that, when executed, cause the processor 210 to execute the third application (e.g., the stereoscopic renderer 290) to perform the stereoscopic rendering when the second application 275 is executed.

According to an example embodiment, the memory 230 may further store instructions that, when executed, cause the processor 210 to execute the first application 270 and the second application 275 in a first application stack and to execute the third application in a second application stack.

According to an example embodiment, the memory 230 may further store instructions that, when executed, cause the processor 210 to change the frame buffer referenced by the display 220 from the second frame buffer 255 to the first frame buffer 245 and to terminate the third application, when a termination request of the second application 275 is identified.

According to an example embodiment, the memory 230 may store at least one of horizontal/vertical size or rotation information of the display 220.

According to an example embodiment, the memory 230 may further store instructions that, when executed, cause the processor 210 to update the second execution screen based on a second user input with respect to the third execution screen.

According to an example embodiment, the memory 230 may further store instructions that, when executed, cause the processor 210 to update the third execution screen based on the updated second execution screen.

Figure 3A:
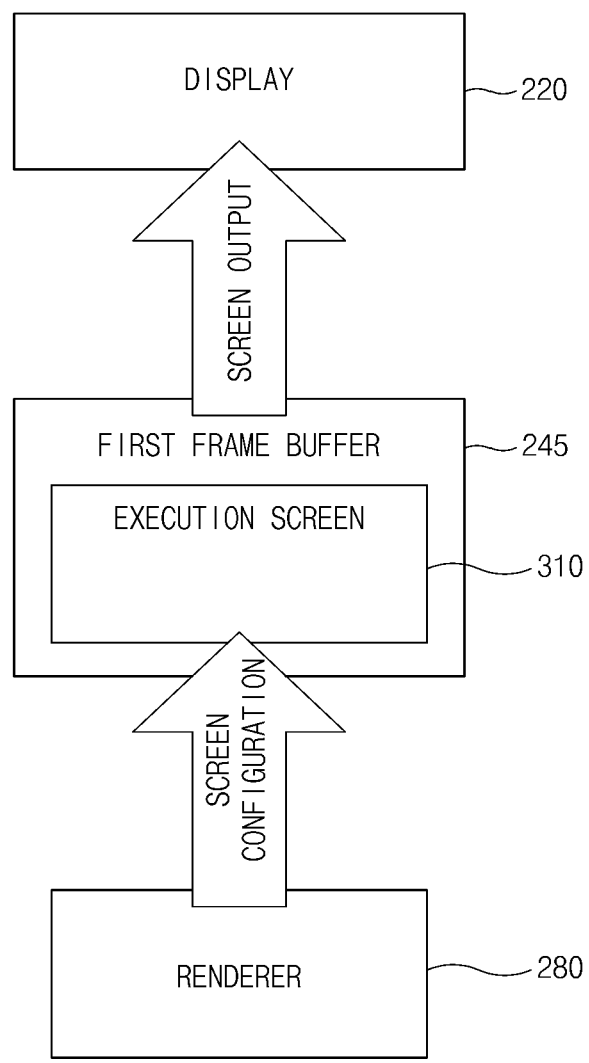
FIG. 3A illustrates an example method of displaying an execution screen by an example electronic device, according to various embodiments.
Figure 3B:
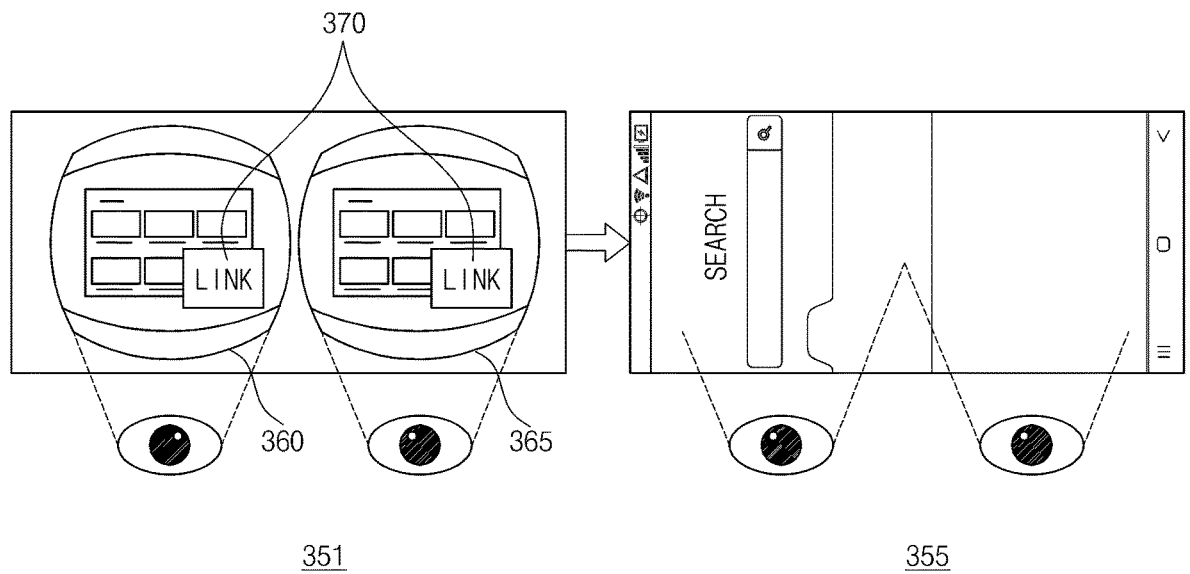
FIG. 3B illustrates an example of a screen displayed through an example electronic device, according to various embodiments.

FIG. 3A illustrates an example method of displaying an execution screen by an example electronic device, according to various embodiments. FIG. 3B illustrates an example of a screen displayed through an example electronic device, according to various embodiments.

Hereinafter, FIGS. 3A and 3B may be described with reference to the configurations of FIG. 2.

According to an embodiment, an application (e.g., the first application 270 or the second application 275) executed in FIG. 3A may request (e.g., onDraw( )) a drawing to the renderer 280 in response to a user input (or execution of the instructions).

According to an embodiment, the renderer 280 may draw a screen provided by the application on a surface allocated to the application (e.g., the first application 270 or the second application 275). The screen provided by the application may be a stereoscopic screen or a non-stereoscopic screen. The renderer 280 may generate screen data representing an execution screen 310 of the application by drawing on the surface allocated to the application. According to an embodiment, the renderer 280 may store the execution screen 310 (or screen data representing the execution screen 310) in the first frame buffer 245 of the logical display 240. According to an embodiment, the execution screen 310 may vary depending on applications (or functions of applications). For example, when an application (e.g., the first application 270) provides an AR environment and/or a VR environment in a 3D space, the execution screen 310 may be a stereoscopic screen. For another example, when an application (e.g., the second application 275) provides a use environment in a two-dimensional space, the execution screen 310 may be a non-stereoscopic screen. In an embodiment, the operation of the renderer 280 may actually be performed by the processor 210.

According to an embodiment, the display 220 may display the execution screen 310 based on screen data stored in the first frame buffer 245.

Referring to FIG. 3B, a first screen 351 may represent a stereoscopic screen displayed through the display 220.

According to an embodiment, the first screen 351 may include a first stereoscopic screen 360 corresponding to the user's left eye (or a FOV of the left eye) and a second stereoscopic screen 365 corresponding to the right eye (or a FOV of the right eye). According to an embodiment, the processor 210 may provide a three-dimensional AR environment and/or VR environment to the user through the first screen 351.

According to an embodiment, a second screen 355 may represent a non-stereoscopic screen displayed through the display 220.

When the second screen 355 in the 2D space is displayed in a situation where a user is experiencing an AR environment and/or a VR environment in the 3D space through the first screen 351, the user's sense of immersion may be damaged. For example, while the first screen 351 is displayed, the second application 275 is executed based on a user input with respect to a UI 370 on the first screen 351, and the second screen 355 provided by the second application is displayed, the user's sense of immersion may be damaged.

Hereinafter, a stereoscopic rendering operation for a non-stereoscopic screen according to an embodiment of the disclosure will be described with reference to FIGS. 4A, 4B, and 4C.

Figure 4A:
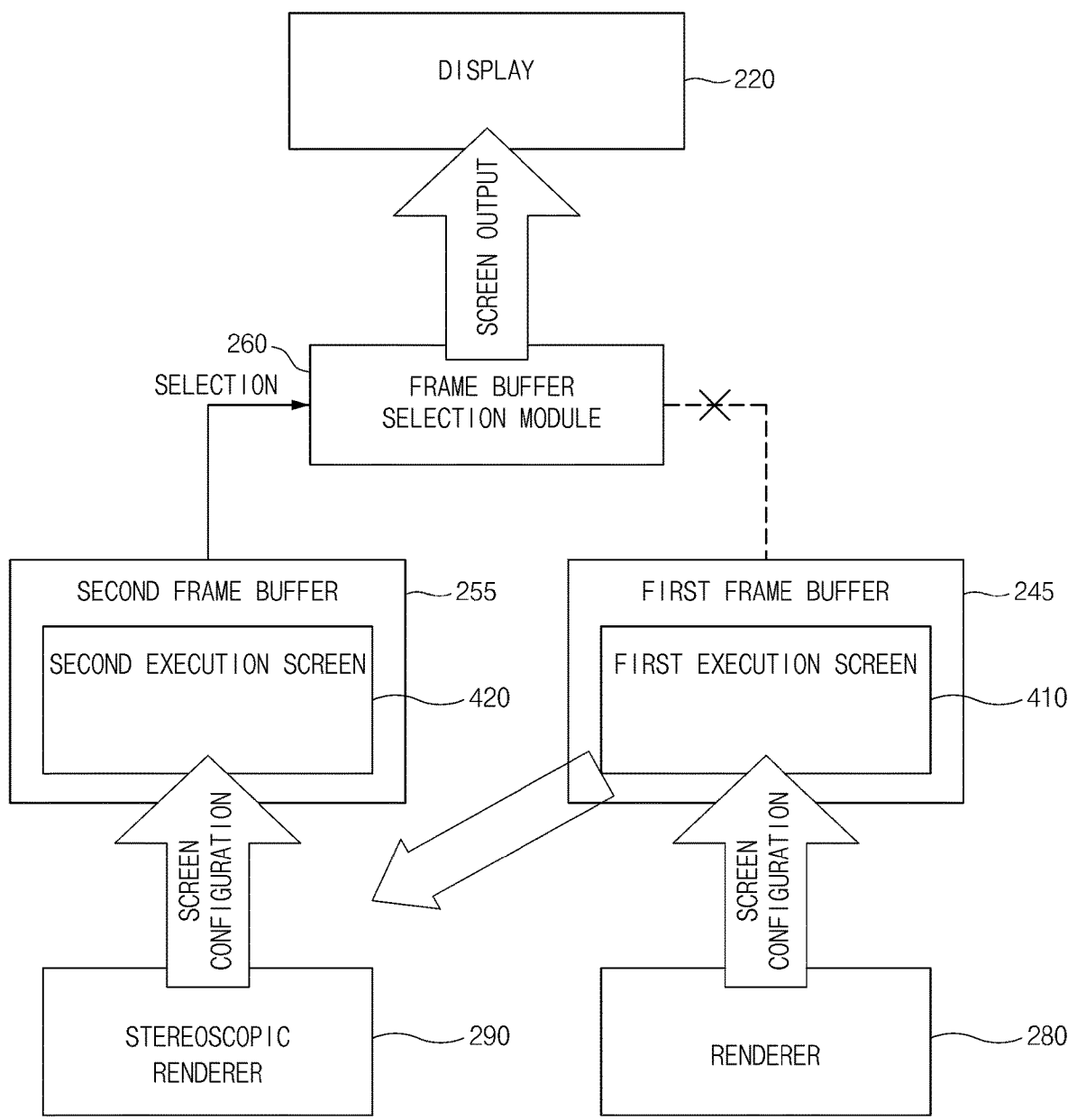
FIG. 4A illustrates an example method of displaying an execution screen by an example electronic device, according to various embodiments.

FIG. 4A illustrates an example method of displaying an execution screen by an example electronic device, according to various embodiments. FIG. 4B illustrates an example of a screen displayed through an example electronic device, according to various embodiments. FIG. 4C illustrates an example execution screen stored in a frame buffer and an example execution screen displayed on a display, according to various embodiments.

Hereinafter, FIGS. 4A, 4B, and 4C may be described with reference to the configurations of FIG. 2.

According to an embodiment, the processor 210 may execute the application (e.g., the second application 275). According to an embodiment, the processor 210 may execute the application (e.g., the second application 275) providing a non-stereoscopic screen while displaying a stereoscopic screen.

According to an embodiment, when the application is executed, the application may request (e.g., onDraw( )) a drawing to the renderer 280. According to an embodiment, the renderer 280 may draw a screen provided by the application on a surface allocated to the application. The renderer 280 may generate screen data representing a first execution screen 410 of the application by drawing on the surface allocated to the application. According to an embodiment, the renderer 280 may store the first execution screen 410 (or screen data representing the first execution screen 410) in the first frame buffer 245 of the logical display 240.

According to an embodiment, the first execution screen 410 may be a non-stereoscopic screen. The processor 210 may execute the stereoscopic renderer 290. The stereoscopic renderer 290 may perform the stereoscopic rendering of the first execution screen 410 stored in the first frame buffer 245 to generate a second execution screen 420. According to an embodiment, the second execution screen 420 may be a stereoscopic screen. The second execution screen 420 may include a stereoscopic screen corresponding to the user's left eye (or a FOV of the left eye) and a stereoscopic screen corresponding to the user's right eye (or a FOV of the right eye). The stereoscopic screen corresponding to the user's left eye (or a FOV of the left eye) and the stereoscopic screen corresponding to the user's right eye (or a FOV of the right eye) may be screens representing the same content with different focus. The processor 210 may store the second execution screen 420 in the second frame buffer 255 of the virtual display (e.g., the virtual display 250 of FIG. 2).

According to an embodiment, the frame buffer selection module 260 may select (or instruct) one of the first frame buffer 245 and the second frame buffer 255. According to an embodiment, the display 220 may display an execution screen stored in the frame buffer selected by the frame buffer selection module 260. For example, data stored in the selected frame buffer may be input to the display 220.

According to an embodiment, the frame buffer selection module 260 may select the second frame buffer 255. For example, the frame buffer selection module 260 may change the frame buffer that is referenced by the display 220 from the first frame buffer 245 to the second frame buffer 255. For example, a change in a frame buffer referred to by the display 220 may be understood as a change in a pointer value linked to the display 220.

According to an embodiment, the processor 210 may display the execution screen stored in the frame buffer instructed by the frame buffer selection module 260 on the display 220. For example, the processor 210 may display the second execution screen 420 stored in the second frame buffer 255 on the display 220.

According to an embodiment, operations of the renderer 280, the stereoscopic renderer 290, and the frame buffer selection module 260 may actually be performed by the processor 210.

Figure 4B:
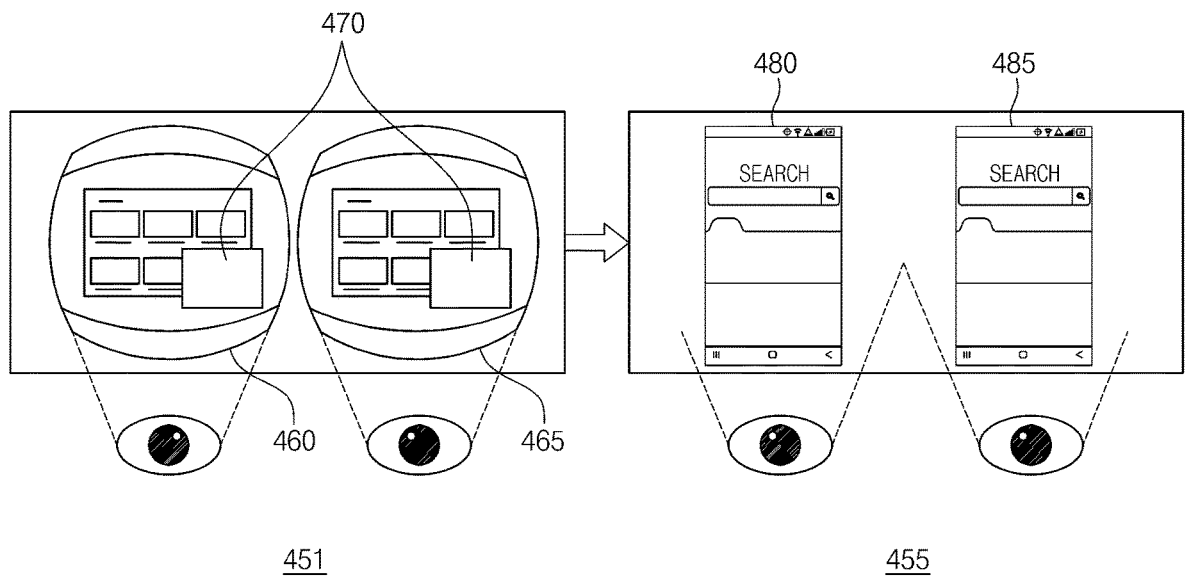
FIG. 4B illustrates an example of a screen displayed through an example electronic device, according to various embodiments.

Referring to FIG. 4B, a first screen 451 and a second screen 455 may represent stereoscopic screens displayed through the display 220. The first screen 451 may correspond to the first screen 351 of FIG. 3B. According to an embodiment, the display of the first screen 451 may be performed according to the same principle as the method of displaying the execution screen of FIG. 3A. The display of the second screen 455 may be performed according to the same principle as the method of displaying the execution screen of FIG. 4A.

According to an embodiment, the processor 210 may execute an application providing a use environment on a 2D space in response to a user input with respect to a UI 470 included in the first screen 451. The processor 210 may display the second screen 455 through the display 220 based on the application.

According to an embodiment, the second screen 455 may be a stereoscopic screen, unlike the second screen 355 of FIG. 3B. The processor 210 may preserve the user's sense of immersion by following the display method of FIG. 4A.

Figure 4C:
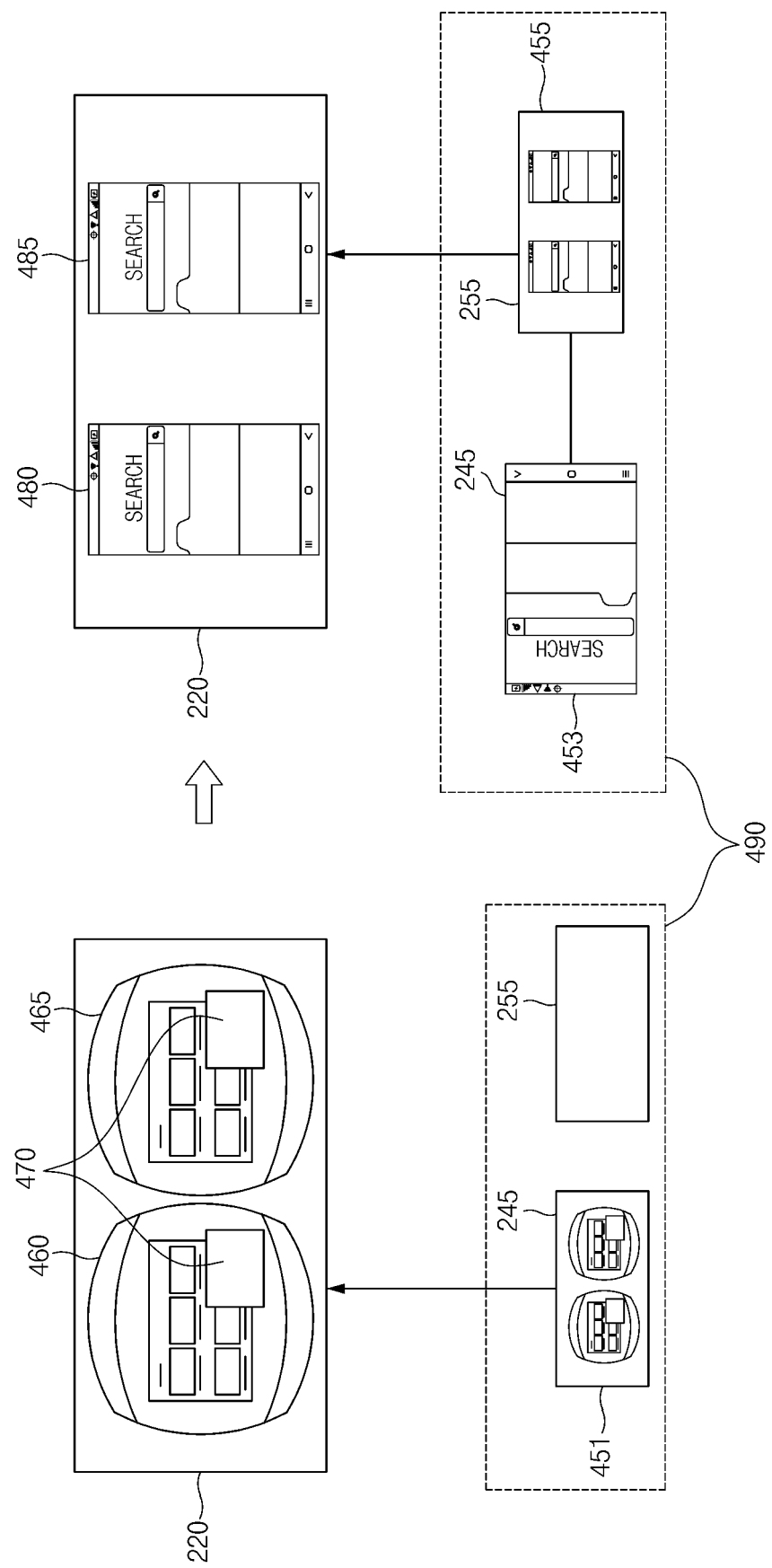
FIG. 4C illustrates an example execution screen stored in a frame buffer and an example execution screen displayed on a display, according to various embodiments.

Referring to FIG. 4C, a reference number 490 illustrates an execution screen (or the screen data representing an execution screen) stored in the first frame buffer (e.g., the first frame buffer 245 of FIG. 2) and the second frame buffer (e.g., the second frame buffer 255 of FIG. 2).

According to an embodiment, the processor 210 may execute an application (e.g., the first application 270 of FIG. 2) for providing an AR environment and/or a VR environment. The first screen 451 may be an execution screen of an application for providing an AR environment and/or a VR environment. The processor 210 may store the first screen 451 in the first frame buffer 245. The processor 210 may display the first screen 451 on the display 220. The first screen 451 may include a first stereoscopic screen 460 corresponding to the user's left eye (or a FOV of the left eye) and a second stereoscopic screen 465 corresponding to the user's right eye (or a FOV of the right eye). The first screen 451 may include an application (e.g., the UI 470 for executing the second application 275 of FIG. 2) that provides a user environment in a two-dimensional space.

According to an embodiment, the processor 210 may execute an application providing a use environment on a 2D space in response to a user's input with respect to the UI 470. According to an embodiment, the renderer 280 may generate data representing an execution screen 453 by drawing a non-stereoscopic screen provided by the application on a surface allocated to the application. The processor 210 may store the execution screen 453 in the first frame buffer 245.

According to an embodiment, the processor 210 may perform the stereoscopic rendering of the execution screen 453 by executing the stereoscopic renderer 290. The stereoscopic renderer 290 may perform the stereoscopic rendering of the execution screen 453 to generate the second screen 455. The second screen 455 may be a stereoscopic screen. The second screen 455 may include a third stereoscopic screen 480 corresponding to the left eye (or a FOV of the left eye) and a fourth stereoscopic screen 485 corresponding to the right eye (or a FOV of the right eye).

According to an embodiment, the processor 210 may display the second screen 455 on the display 220. For example, the frame buffer selection module 260 may change the frame buffer that is referenced by the display 220 from the first frame buffer 245 to the second frame buffer 255. The processor 210 may input screen data stored in the second frame buffer 255 to the display 220.

Figure 5:
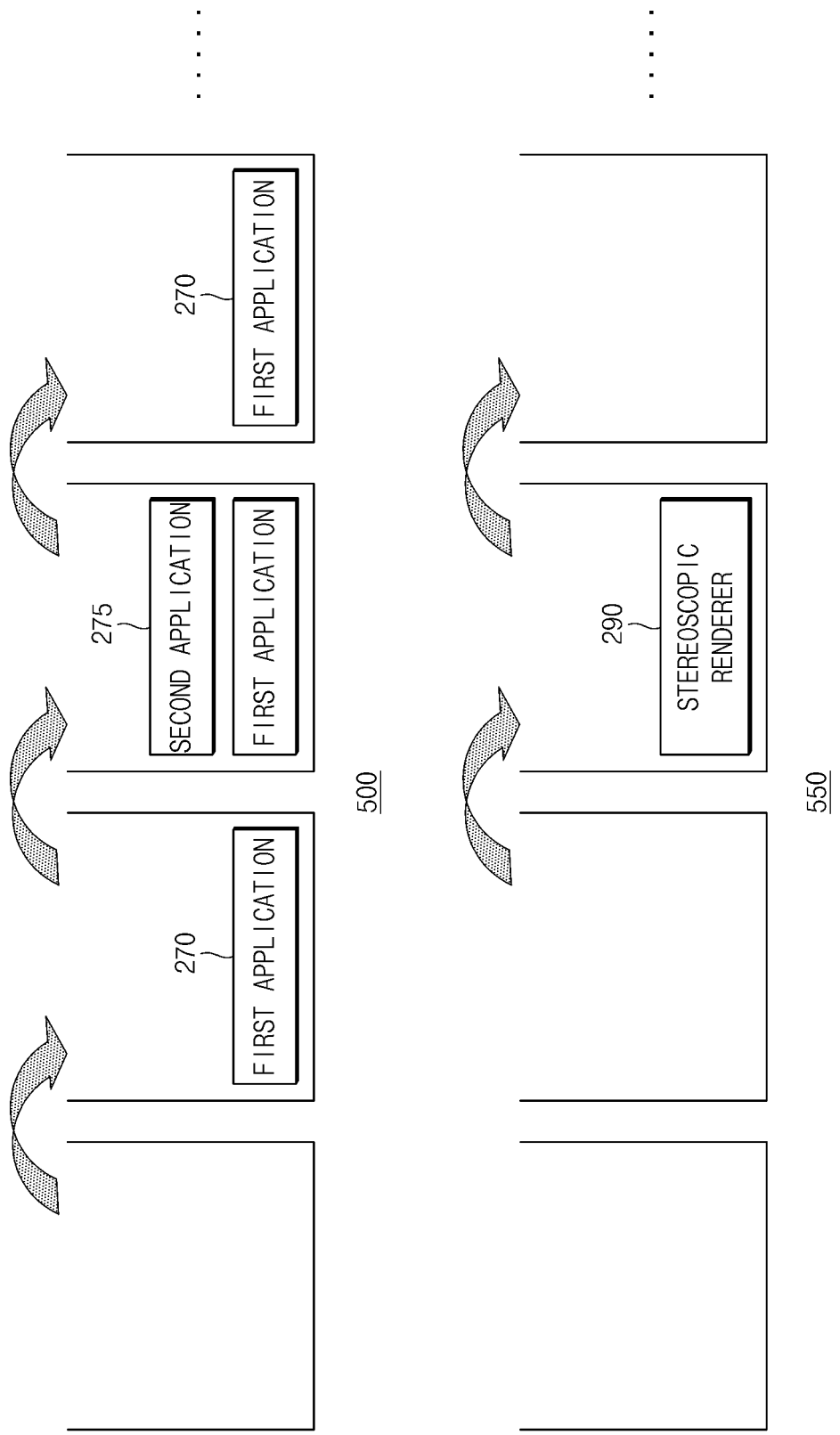
FIG. 5 illustrates an example app stack in which applications are executed, according to various embodiments.

FIG. 5 illustrates an example app stack in which applications are executed, according to various embodiments.

According to an embodiment, applications (e.g., the first application 270, the second application 275, and the stereoscopic renderer 290 of FIG. 2) may be executed in an app stack. According to an embodiment, applications may be executed and/or terminated in a last in first out (LIFO) method in an app stack. According to an embodiment, when a plurality of applications are executed in one app stack, an execution screen of the most recently executed application may be displayed on the display 220.

According to an embodiment, the plurality of applications executed in one app stack may share authority (e.g., authority to access the memory 230 and authority to collect position information) for the electronic device 200. For example, the first application 270 may request the access authority with respect to data stored in the memory 230 to the user. Based on the user's acceptance for the authority request, the first application 270 may obtain the access authority with respect to data stored in the memory 230. The second application 275 may be executed after the first application 270 is executed. When the second application 275 is executed in the same app stack as the first application 270, the second application 275 may obtain the access authority with respect to data stored in the memory 230. When the second application 275 is executed in an app stack different from that of the first application 270, the second application 275 may not be able to obtain the access authority with respect to data stored in the memory 230. In this case, the second application 275 may request the access authority with respect to data stored in the memory 230 to the user.

According to an embodiment, the logical display 240 and the virtual display 250 may respectively have an app stack. For example, the logical display 240 may have a first app stack 500. For example, the virtual display 250 may have a second app stack 550.

According to an embodiment, the processor 210 may execute the first application 270 in the first app stack 500. The processor 210 may display the execution screen of the first application 270 on the display 220. The execution screen of the first application 270 may be a stereoscopic screen.

According to an embodiment, the processor 210 may execute the second application 275 in the first app stack 500. The second application 275 may provide a non-stereoscopic screen. The processor 210 may execute the stereoscopic renderer 290 in the second app stack 550. According to an embodiment, the stereoscopic renderer 290 may be executed in response to the execution of the second application 275. The stereoscopic renderer 290 may stereoscopically render a non-stereoscopic screen provided by the second application 275. According to an embodiment, the processor 210 may display the stereoscopically rendered execution screen of the second application 275 on the display 220.

According to an embodiment, when the execution of the second application 275 is terminated, the processor 210 may terminate the second application 275 in the first app stack 500 and may terminate the stereoscopic renderer 290 in the second app stack 550. The processor 210 may display the execution screen of the first application 270 on the display 220 again.

According to an embodiment, the first application 270 and the second application 275 may be executed in the same app stack (e.g., the first app stack 500). The second application 275 may have the same authority as the first application 270. According to an embodiment, the processor 210 may increase compatibility between applications and may enable sequential processing by executing the first application 270 and the second application 275 in the same app stack.

Figure 6:
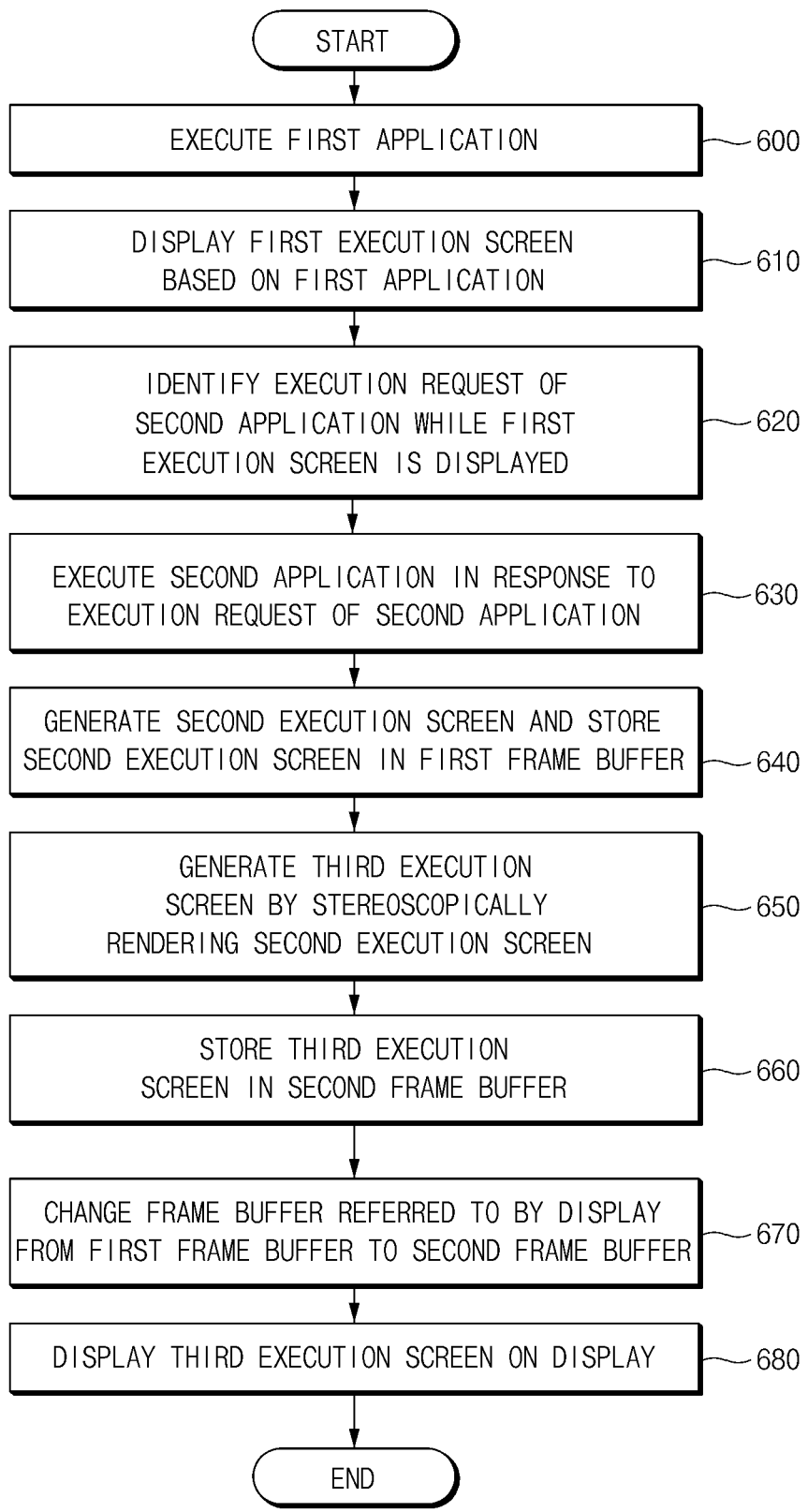
FIG. 6 is a flowchart describing an example stereoscopic rendering method of an example electronic device, according to various embodiments.

FIG. 6 is a flowchart describing an example stereoscopic rendering method of an example electronic device, according to various embodiments.

In operation 600, a processor (e.g., the processor 210 of FIG. 2) may execute a first application (e.g., the first application 270 of FIG. 2). According to an embodiment, the first application 270 may provide a stereoscopic screen. According to an embodiment, the processor 210 may execute the first application 270 to provide an AR environment and/or a VR environment to a user.

In operation 610, the processor 210 may display a first execution screen based on the first application 270. According to an embodiment, the processor 210 may render an execution result of the first application 270 and may store the rendered data in the first frame buffer 245. Thereafter, the processor 210 may display the first execution screen on the display 220 by inputting the data stored in the first frame buffer 245 to the display 220. According to an embodiment, the first execution screen may be a stereoscopic screen.

In operation 620, the processor 210 may identify an execution request of a second application (e.g., the second application 275 of FIG. 2) while displaying the first execution screen. According to an embodiment, the second application 275 may provide a non-stereoscopic screen. According to an embodiment, the second application 275 may be an application that provides a use environment in a two-dimensional space. According to an embodiment, the execution request may be obtained through a user input. For example, the execution request may be obtained through a user input (e.g., a gesture) with respect to a UI (e.g., the UI 370 of FIG. 3B) included in the first execution screen. The user input may include, for example, a designated motion (e.g., shaking or pointing) using a part (e.g., a hand or a foot) of the user's body.

In operation 630, the processor 210 may execute the second application 275 in response to the execution request.

In operation 640, the processor 210 may generate a second execution screen and may store the second execution screen in the first frame buffer 245. For example, the processor 210 may render an execution result of the second application 275 and may store the rendered data in the first frame buffer 245.

In operation 650, the processor 210 may stereoscopically render the second execution screen to generate a third execution screen. According to an embodiment, the third execution screen may be a stereoscopic screen. For example, the third execution screen may include a stereoscopic screen corresponding to the user's left eye (or a FOV of the left eye) and a stereoscopic screen corresponding to the user's right eye (or a FOV of the right eye).

In operation 660, the processor 210 may store the third execution screen in a second frame buffer (e.g., the second frame buffer 255 of FIG. 2). According to an embodiment, the processor 210 may allocate (or generate) the virtual display 250 in the memory 230. The processor 210 may store the third execution screen in the second frame buffer 255 of the virtual display 250.

In operation 670, the processor 210 may change the frame buffer referred to by the display 220 from the first frame buffer 245 to the second frame buffer 255. According to an embodiment, a frame buffer selection module (e.g., the frame buffer selection module 260 of FIG. 2) may select a frame buffer referred to by the display 220. A change in the frame buffer referenced by the display 220 may be understood as a change in a pointer value linked to the display 220. For example, the frame buffer selection module 260 may select the second frame buffer 255 to display the execution screen of the second application on the display 220. According to an embodiment, an operation of the frame buffer selection module 260 may actually be performed by the processor 210.

In operation 680, the processor 210 may display a third execution screen on the display 220. The processor 210 may display the third execution screen based on screen data for displaying the third execution screen stored in the second frame buffer 255.

Figure 7:
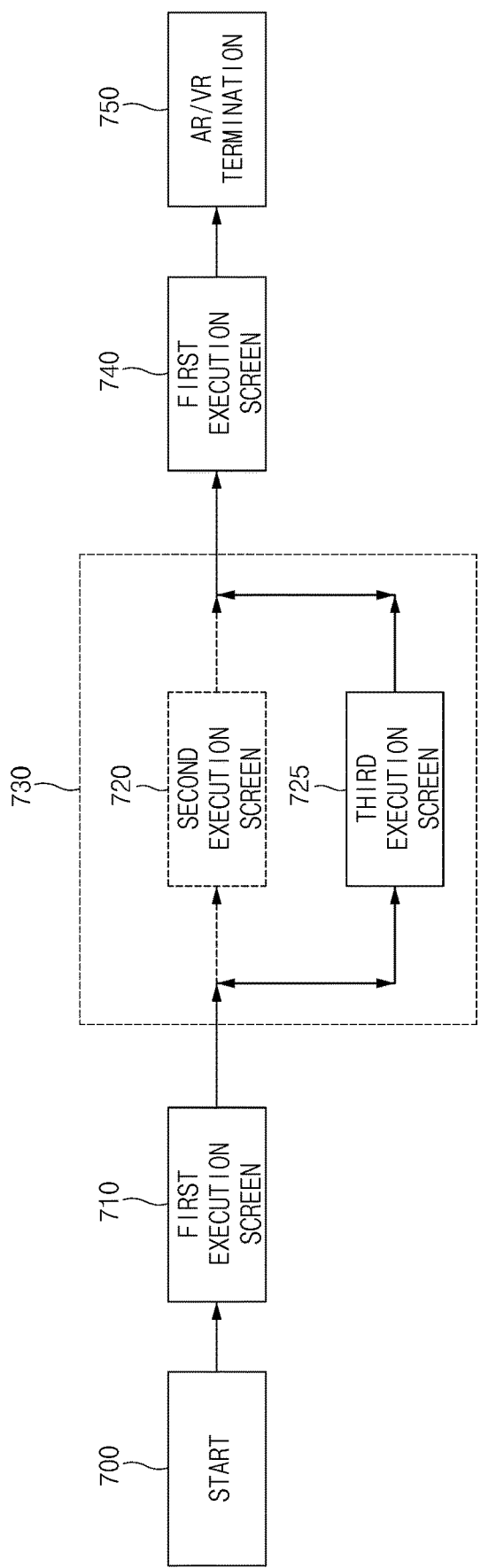
FIG. 7 illustrates an example operation of an example electronic device, according to various embodiments.

FIG. 7 illustrates an example operation of an example electronic device, according to various embodiments. Hereinafter, FIG. 7 may be described with reference to the configurations of FIG. 2.

At a reference number 700, the electronic device 200 may start providing an AR environment and/or a VR environment to the user. For example, the processor 210 may execute the first application 270 providing a stereoscopic screen.

The processor 210 may generate a first execution screen by rendering a screen provided by the first application 270. The first execution screen (or screen data for representing the first execution screen) may be stored in the first frame buffer 245. A reference number 710 indicates that the first execution screen stored in the first frame buffer 245 is displayed on the display 220.

According to an embodiment, the processor 210 may execute the second application 275. For example, the second application 275 may provide a non-stereoscopic screen. The processor 210 may generate a second execution screen by rendering a non-stereoscopic screen provided by the second application 275. The second execution screen may be a non-stereoscopic screen. A reference number 720 indicates that the generated second execution screen is stored in the first frame buffer 245.

According to an embodiment, the processor 210 may execute the stereoscopic renderer 290 to stereoscopically render the second execution screen. The stereoscopic renderer 290 may be executed in response to execution of the second application 275. The stereoscopic renderer 290 may generate a third execution screen by stereoscopically rendering the second execution screen. The third execution screen may be a stereoscopic screen. A reference number 725 indicates that the generated third execution screen is stored in the second frame buffer 255. The operation of the stereoscopic renderer 290 may actually be performed by the processor 210.

According to an embodiment, the frame buffer selection module 260 may select (or instruct) a frame buffer referred to by the display 220. For example, a change in a frame buffer referred to by the display 220 may be understood as a change in a pointer value linked to the display 220. The frame buffer selection module 260 may select the second frame buffer 255 in relation to the execution screen of the second application. The processor 210 may display the third execution screen stored in the second frame buffer 255 on the display 220. The processor 210 may preserve the user's sense of immersion by providing a three-dimensional screen to the user. A reference number 730 may indicate that the frame buffer selection module 260 selects the second frame buffer 255 and the third execution screen stored in the second frame buffer 255 is displayed on the display 220. The operation of the frame buffer selection module 260 may actually be performed by the processor 210.

According to an embodiment, when the second application 275 is terminated, the processor 210 may display the first execution screen on the display 220 again.

According to an embodiment, the processor 210 may terminate the second application 275 when a termination request of the second application 275 is identified. The processor 210 may terminate the stereoscopic renderer 290 based on the termination of the second application 275.

According to an embodiment, the processor 210 may terminate the second application 275 and may generate a first execution screen by rendering a screen provided by the first application 270. The first execution screen (or screen data for representing the first execution screen) may be stored in the first frame buffer 245.

According to an embodiment, the frame buffer selection module 260 may select the first frame buffer 245 in relation to the execution screen of the first application. For example, the operation in which the frame buffer selection module 260 selects the first frame buffer 245 may be understood as changing a pointer value linked to the display 220 back to a value corresponding to the first frame buffer 245.

The reference number 730 may indicate that the frame buffer selection module 260 selects the first frame buffer 245 again, and the first execution screen stored in the first frame buffer 245 is displayed on the display 220.

A reference number 740 indicates that the first execution screen is displayed on the display 220.

In a reference number 750, when the execution of the first application 270 is terminated, the processor 210 may terminate its operation.

Figure 8:
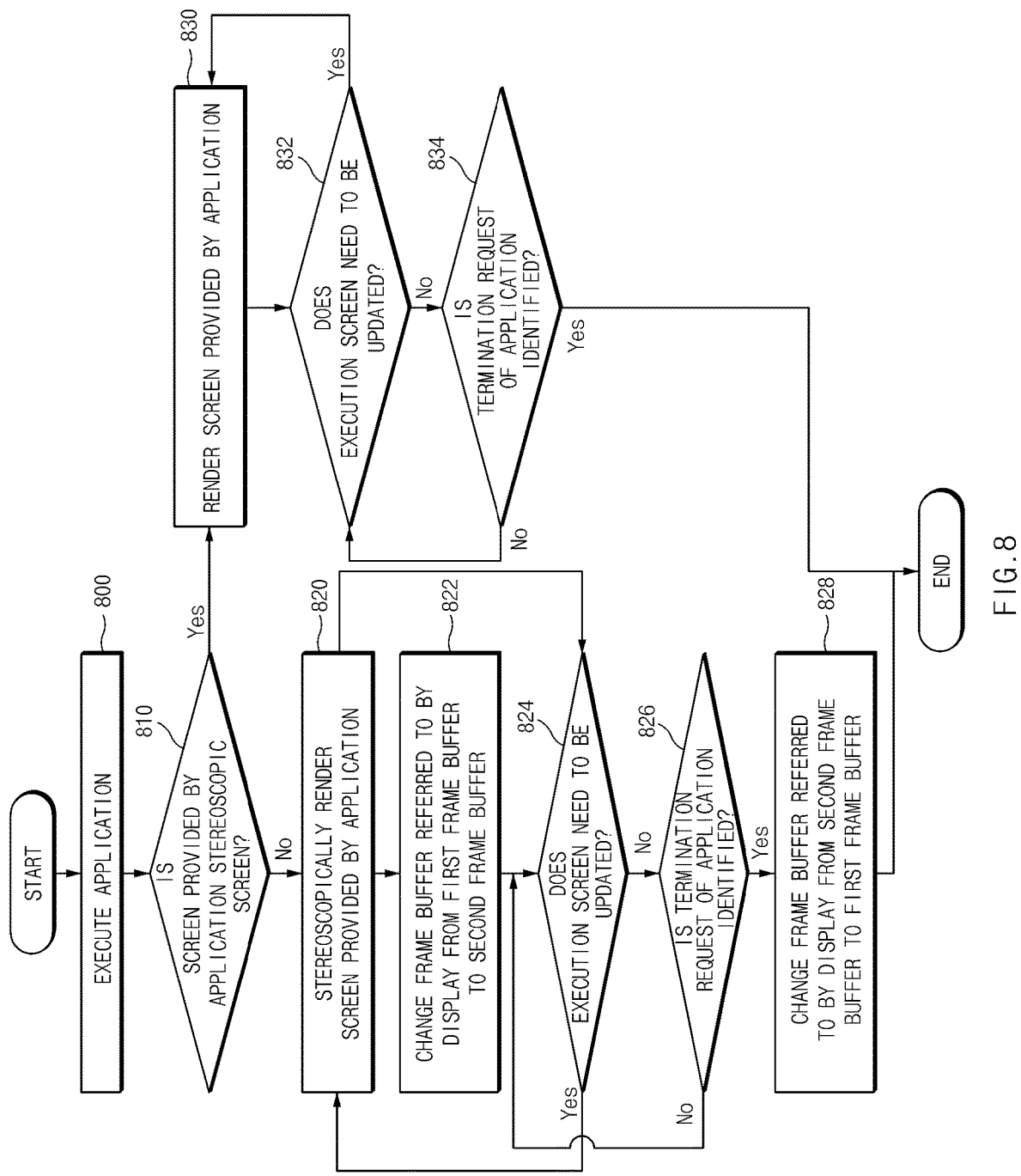
FIG. 8 is a flowchart describing an example method of providing an AR environment and/or a VR environment, according to various embodiments.

FIG. 8 is a flowchart describing an example method of providing an AR environment and/or a VR environment, according to various embodiments.

Hereinafter, FIG. 8 may be described with reference to the configurations of FIG. 2.

In operation 800, the processor 210 may execute an application (e.g., the first application 270 or the second application 275).

In operation 810, the processor 210 may identify whether the screen provided by the application is a stereoscopic screen.

When the screen provided by the application is a non-stereoscopic screen (810—NO), the processor 210 may proceed to operation 820.

In operation 820, the processor 210 may stereoscopically render a screen provided by an application. The processor 210 may store the stereoscopically rendered execution screen in the second frame buffer 255. In operation 822, the processor 210 may change the frame buffer referred to by the display 220 from the first frame buffer 245 to the second frame buffer 255. The processor 210 may display the execution screen stored in the second frame buffer 255 on the display 220. For example, further descriptions of operations 820 and 822 may be found with reference to the description of FIG. 4A.

In operation 824, the processor 210 may identify whether an execution screen needs to be updated. According to an embodiment, the execution screen may include a user interface (UI) capable of interacting with a user. The processor 210 may execute a preset function in response to a user input with respect to the UI. The application may provide an execution screen based on the execution of a preset function. Accordingly, the processor 210 needs to update the execution screen currently displayed on the display 220 to an execution screen based on the execution of a preset function.

When updating of the execution screen is required (824—YES), the processor 210 may return to operation 820. In operation 820, the processor 210 may stereoscopically render a screen provided by an application to generate an updated execution screen. The processor 210 may display the updated execution screen on the display 220 and may proceed to operation 824. In this case, the display 220 may already refer to the second frame buffer 255. Therefore, operation 822 may be omitted.

When updating of the execution screen is not required (824—NO), the processor 210 may proceed to operation 826. In operation 826, the processor 210 may identify a termination request of the application. For example, the processor 210 may receive a user input with respect to a UI indicating termination of the application and may identify the termination request of the application.

When the termination request of the application is not identified (826—NO), the processor 210 may return to operation 824.

When the termination request of the application is identified (826—YES), the processor 210 may proceed to operation 828. In operation 828, the processor 210 may change the frame buffer referred to by the display 220 from the second frame buffer 245 to the first frame buffer 255. The processor 210 may terminate the application and may terminate the operation.

Referring back to operation 810, when the screen provided by the application is a stereoscopic screen (810—YES), the processor 210 may proceed to operation 830.

In operation 830, the processor 210 may render a screen provided by the application. For example, further description of operation 830 may be found with reference to the description of FIG. 3A.

In operation 832, the processor 210 may identify whether an execution screen needs to be updated. When updating of the execution screen is required (832—YES), the processor 210 may return to operation 830. In operation 830, the processor 210 may generate an updated execution screen by rendering a screen provided by the application.

When updating of the execution screen is not required (832—NO), the processor 210 may proceed to operation 834. In operation 834, the processor 210 may identify a termination request of the application.

When the termination request of the application is not identified (834—NO), the processor 210 may return to operation 832.

When the termination request of the application is identified (834—YES), the processor 210 may terminate the application and may terminate the operation.

Figure 9:
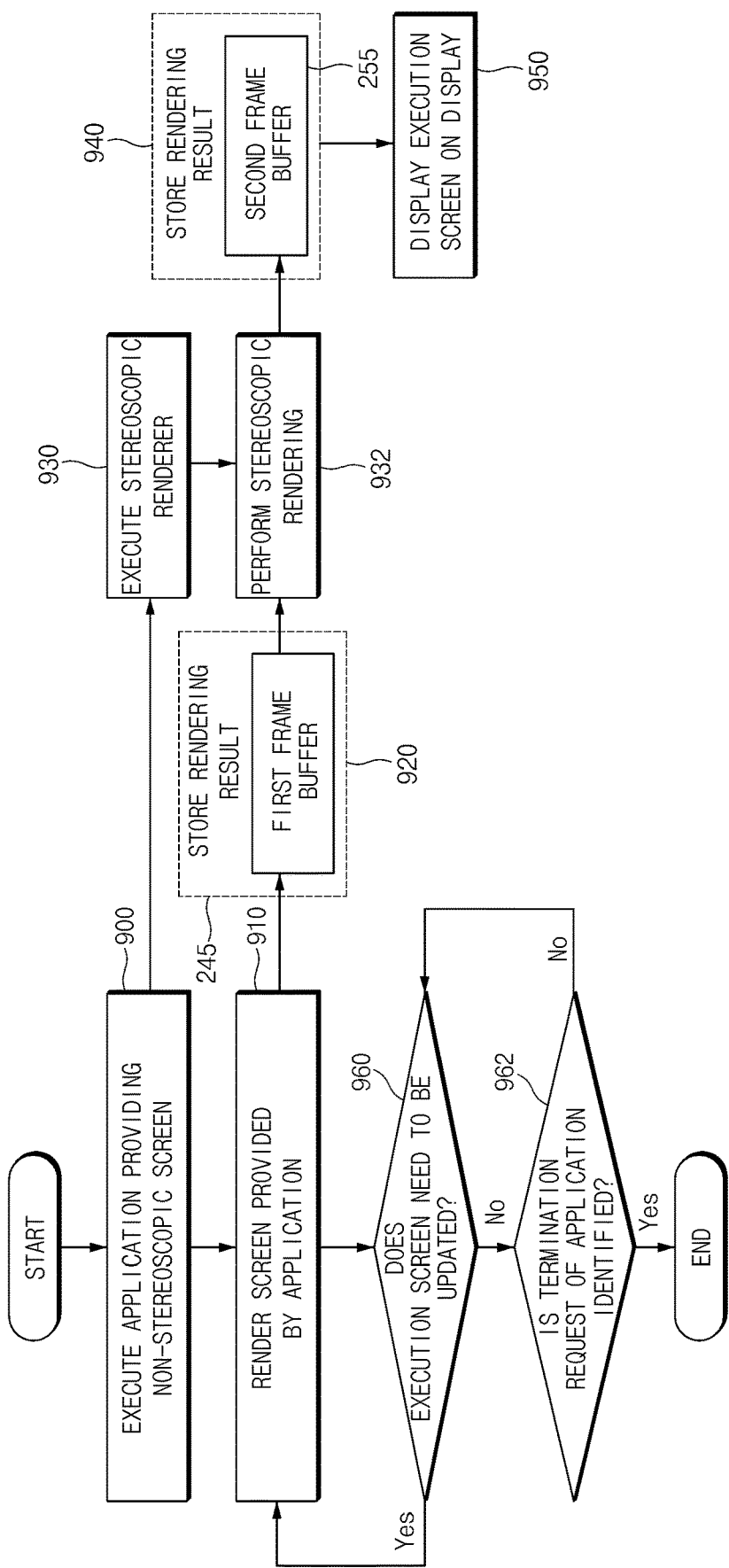
FIG. 9 is a flowchart describing an example rendering loop of an example electronic device, according to various embodiments.

FIG. 9 is a flowchart describing an example rendering loop of an example electronic device, according to various embodiments. Hereinafter, FIG. 9 may be described with reference to the configurations of FIG. 2.

In operation 900, the processor 210 may execute the application 275 providing a non-stereoscopic screen. The processor 210 may proceed to operations 910 and 930. Operations 910 and 930 may be performed simultaneously or sequentially.

According to an embodiment, the processor 210 may render a screen provided by the application in operation 910. The processor 210 may proceed to operation 920 and may store the rendering result in the first frame buffer 245. The rendering result may be screen data representing an execution screen of an application. The screen stored in operation 920 may be a non-stereoscopic screen.

According to an embodiment, the processor 210 may execute the stereoscopic renderer 290 in operation 930. The stereoscopic renderer 290 may be executed in response to the execution of the application. The processor 210 may proceed to operation 932 to perform stereoscopic rendering. According to an embodiment, the processor 210 may stereoscopically render the screen data stored in the first frame buffer 245. The processor 210 may proceed to operation 940 and may store the rendering result in the second frame buffer 255. The rendering result may be screen data representing the execution screen of the application. The screen stored in operation 940 may be a stereoscopic screen. For example, a change in a frame buffer referred to by the display 220 may be understood as a change in a pointer value linked to the display 220.

The processor 210 may proceed to operation 950 and may display the execution screen stored in the second frame buffer 255 on the display 220. According to an embodiment, before operation 950, the processor 210 may change the frame buffer referred to by the display 220 from the first frame buffer 245 to the second frame buffer 255. For example, a change in a frame buffer referred to by the display 220 may be understood as a change in a pointer value linked to the display 220.

According to an embodiment, the processor 210 may render a screen provided by the application in operation 910 and may proceed to operation 960. In operation 960, the processor 210 may determine whether an execution screen needs to be updated. Operation 960 may correspond to operation 824 of FIG. 8.

When updating of the execution screen is required (960—YES), the processor 210 may proceed to operation 910. The processor 210 may perform operations 910 to 950 to display the updated execution screen on the display 220.

When updating of the execution screen is not required (960—NO), the processor 210 may proceed to operation 962. In operation 962, the processor 210 may identify a termination request of the application.

When the termination request of the application is not identified (962—NO), the processor 210 may return to operation 960.

When the termination request of the application is identified (962—YES), the processor 210 may terminate the application and may terminate the operation. According to an embodiment, before terminating the operation, the processor 210 may change the frame buffer referred to by the display 220 from the second frame buffer 255 to the first frame buffer 245.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a display;
   a processor comprising processing circuitry, and a memory operatively connected to the display and the processor, wherein the memory stores instructions that, when executed, cause the processor to:

execute a first application providing a stereoscopic screen;

store a first execution screen generated by rendering a screen provided by the first application in a first frame buffer;

identify an execution request of a second application providing a non-stereoscopic screen while the first execution screen is displayed on the display;

execute the second application in response to the execution request of the second application;

store a second execution screen generated by rendering a screen provided by the second application in the first frame buffer;

store a third execution screen generated by stereoscopic rendering of the second execution screen in a second frame buffer different from the first frame buffer;

change a frame buffer which is referenced by the display from the first frame buffer to the second frame buffer; and allow the display to display the third execution screen.

2. The electronic device of claim 1, wherein the memory further stores instructions that, when executed, cause the processor to:

when the frame buffer which is referenced by the display is changed from the first frame buffer to the second frame buffer, change a value of a pointer linked to the display.

3. The electronic device of claim 1, wherein the stereoscopic screen includes a stereoscopic screen corresponding to a right eye of a user and a stereoscopic screen corresponding to a left eye of the user.

4. The electronic device of claim 1, wherein the first execution screen includes a user interface (UI) for executing the second application, and wherein the memory further stores instructions that, when executed, cause the processor to:

execute the second application based on a first user input with respect to the UI.

5. The electronic device of claim 1, wherein the memory further stores instructions that, when executed, cause the processor to:

execute a third application to perform the stereoscopic rendering when the second application is executed.

6. The electronic device of claim 5, wherein the memory further stores instructions that, when executed, cause the processor to:

execute the first application and the second application in a first application stack; and execute the third application in a second application stack different from the first application stack.

7. The electronic device of claim 5, wherein the memory further stores instructions that, when executed, cause the processor to:

change the frame buffer which is referenced by the display from the second frame buffer to the first frame buffer when a termination request of the second application is identified; and terminate the third application.

8. The electronic device of claim 1, wherein the memory stores at least one of information on horizontal and vertical size of the display, or rotation information of the display.

9. The electronic device of claim 1, wherein the memory further stores instructions that, when executed, cause the processor to:

update the second execution screen based on a first user input with respect to the third execution screen.

10. The electronic device of claim 9, wherein the memory further stores instructions that, when executed, cause the processor to:

update the third execution screen based on the updated second execution screen.

11. A method of operating an electronic device, the method comprising:

executing a first application providing a stereoscopic screen;

storing a first execution screen generated by rendering a screen provided by the first application in a first frame buffer;

identifying an execution request of a second application providing a non-stereoscopic screen while the first execution screen is displayed;

executing the second application in response to the execution request of the second application;

storing a second execution screen generated by rendering a screen provided by the second application in the first frame buffer;

storing a third execution screen generated by stereoscopic rendering of the second execution screen in a second frame buffer different from the first frame buffer;

changing a frame buffer which is referenced by a display from the first frame buffer to the second frame buffer; and allowing the display to display the third execution screen.

12. The method of claim 11, wherein the changing of the frame buffer which is referenced by the display from the first frame buffer to the second frame buffer includes:

changing a value of a pointer linked to the display.

13. The method of claim 11, wherein the stereoscopic screen includes a stereoscopic screen corresponding to a right eye of a user and a stereoscopic screen corresponding to a left eye of the user.

14. The method of claim 11, wherein the first execution screen includes a user interface (UI) for executing the second application, and wherein the identifying of the execution request of the second application providing the non-stereoscopic screen includes:

identifying the execution request of the second application based on a first user input with respect to the UI.

15. The method of claim 11, further comprising:

executing a third application to perform the stereoscopic rendering when the second application is executed.

16. The method of claim 15, further comprising:

executing the first application and the second application in a first application stack; and executing the third application in a second application stack different from the first application stack.

17. The method of claim 15, further comprising:

changing the frame buffer which is referenced by the display from the second frame buffer to the first frame buffer when a termination request of the second application is identified; and terminating the third application.

18. The method of claim 11, further comprising:

storing in a memory at least one of information on horizontal and vertical size of the display, or rotation information of the display.

19. The method of claim 11, further comprising:
updating the second execution screen based on a first user input with respect to the third execution screen.
20. The method of claim 19, further comprising:
updating the third execution screen based on the updated second execution screen.

\* \* \* \* \*